United States Patent
Matsumoto et al.

(10) Patent No.: US 9,156,106 B2
(45) Date of Patent: Oct. 13, 2015

(54) WELDING GUN

(75) Inventors: Koichi Matsumoto, Tochigi (JP);
Teruaki Kobayashi, Tochigi (JP);
Hiroshi Miwa, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 214 days.

(21) Appl. No.: 13/695,120

(22) PCT Filed: Apr. 11, 2011

(86) PCT No.: PCT/JP2011/059027
§ 371 (c)(1),
(2), (4) Date: Oct. 29, 2012

(87) PCT Pub. No.: WO2011/136013
PCT Pub. Date: Nov. 3, 2011

(65) Prior Publication Data
US 2013/0037529 A1    Feb. 14, 2013

(30) Foreign Application Priority Data

Apr. 30, 2010   (JP) .................................. 2010-105124

(51) Int. Cl.
*B23K 11/11* (2006.01)
*B23K 11/31* (2006.01)

(52) U.S. Cl.
CPC ............. *B23K 11/115* (2013.01); *B23K 11/315* (2013.01); *B23K 2201/18* (2013.01)

(58) Field of Classification Search
USPC ................. 219/90, 127, 136, 137.31, 137.62, 219/137.44; 310/46, 47, 50, 54
See application file for complete search history.

(56) References Cited

U.S. PATENT DOCUMENTS

2004/0208031 A1*  10/2004  Miwa et al. ................... 363/141

FOREIGN PATENT DOCUMENTS

| JP | 63-120904 | 5/1988 |
| JP | 10-211582 | 8/1998 |
| JP | 10-220414 | 8/1998 |
| JP | 11-197843 | 7/1999 |
| JP | 2000-158144 | 6/2000 |
| JP | 2000-176646 | 6/2000 |
| JP | 2001-293577 | 10/2001 |
| JP | 2002-160066 | 6/2002 |
| JP | 2007-176646 | 7/2007 |
| JP | 2007-216280 | 8/2007 |
| JP | 2010-017744 | 1/2010 |
| JP | 2010-036244 | 2/2010 |

OTHER PUBLICATIONS

Chinese Office Action dated Aug. 5, 2014, 8 pages.

* cited by examiner

*Primary Examiner* — Brian Jennison
(74) *Attorney, Agent, or Firm* — Rankin, Hill & Clark LLP

(57) ABSTRACT

A flange section 12*b* protruding in a radial direction of a ball screw shaft 6*a* is formed at a lower end portion of the ball screw shaft 6*a*, and a protrusion stopper 12*a* which abuts on the flange section 12*b* to prevent the ball screw shaft 6*a* from protruding out of the rod 7 is formed in a hollow section of the rod 7. On the lower side of the hollow section of the rod 7, there is formed a retraction stopper 13*a* which abuts on a lower end portion 13*b* of the ball screw shaft 6*a* to limit the retraction of the rod 7.

1 Claim, 3 Drawing Sheets

WELDING GUN

TECHNICAL FIELD

The present invention relates to a welding gun, and more particularly, it relates to an electromotive spot welding gun which allows a movable electrode tip to advance to and retreat from a fixed electrode tip.

BACKGROUND ART

Heretofore, there has been known an electromotive spot welding gun which allows a movable electrode tip to advance to and retreat from a fixed electrode tip. For example, in Patent Document 1, there is disclosed a welding gun which allows a rod including a movable electrode tip at a front edge thereof and inserted into a hollow rotor of a motor to advance to and retreat from a gun main body by a rotating movement of a feed screw mechanism coupled to the hollow motor.

Meanwhile, to prevent failure of the welding gun at the failure of a controller of the welding gun, the input of a wrong set value into the controller by an operator, or the like, there is required a stopper mechanism which regulates an advancing/retreating movement of the rod out of a stipulated region.

For example, when the rod projects out of the stipulated region and drops down from the gun main body, the welding gun cannot be restored. Therefore, to regulate the projecting of the rod, a flange section is formed at an upper end of the rod, and a stopper ring is disposed in a hollow housing of the motor. In consequence, when the rod projects out of the stipulated region, the flange section abuts on the stopper ring to prevent the rod from protruding.

Moreover, when the rod retracts out of the stipulated region to collide with the bottom surface of the hollow rotor of the motor, the feed screw mechanism fails. Therefore, to regulate the retraction of the rod, stoppers are arranged at an upper end of the gun main body and an upper end of a fixing portion of the movable electrode tip fixed to the rod, respectively. In consequence, when the rod retracts out of the stipulated region, these stoppers abut, whereby the further retraction movement of the rod is prevented.

PRIOR ART DOCUMENT

Patent Document

Patent Document 1: Japanese Patent Laid-Open No. H11-197843

SUMMARY OF THE INVENTION

Problem to be Solved by the Invention

However, when a flange section is formed at an upper end of a rod to regulate the projecting of the rod, an inner diameter of a hollow rotor increases, and hence there is the problem that not only a motor but also a welding gun is enlarged.

Moreover, when a stopper is disposed at an upper end of a gun main body to regulate the retraction of the rod, there is the problem that not only the gun main body but also the welding gun is enlarged.

The present invention has been developed in view of the above problems, and an object thereof is to provide a welding gun including a stopper mechanism which regulates an advancing/retreating movement of a rod out of a stipulated region, whereby miniaturization is possible.

Means for Solving the Problem

The present invention provides an electromotive spot welding gun which allows a movable electrode tip to advance to and retreat from a fixed electrode tip, comprising: a hollow servo motor including a housing disposed to a gun main body, a stator fixed in the housing, and a hollow rotor rotatably supported by the housing; a rod including the movable electrode tip at one end thereof, formed to be hollow on the other end side, and inserted into the hollow rotor; a ball screw shaft fixed to the hollow rotor, including a thread groove extending in an axial direction, and inserted into a hollow section of the rod; and a nut screwed into the thread groove of the ball screw shaft, and fixed to the rod on the other end side, characterized in that a flange section protruding in a radial direction of the ball screw shaft is formed on the movable electrode tip side of the ball screw shaft, and a protrusion stopper which abuts on the flange section to prevent the ball screw shaft from protruding out of the rod is formed in the hollow section of the rod (the first aspect of the invention).

According to the first aspect of the invention, the flange section is formed on the movable electrode side of the ball screw shaft, and accordingly, it is not necessary to increase an inner diameter of the hollow rotor. Moreover, the protrusion stopper is formed in the hollow section of the rod, and accordingly, it is not necessary to increase the inner diameter of the hollow rotor. Therefore, unlike the above conventional technology, the miniaturization of not only the hollow motor but also the welding gun is possible.

Moreover, the present invention provides an electromotive spot welding gun which allows a movable electrode tip to advance to and retreat from a fixed electrode tip, comprising: a hollow servo motor including a housing disposed to a gun main body, a stator fixed in the housing, and a hollow rotor rotatably supported by the housing; a rod including the movable electrode tip at one end thereof, formed to be hollow on the other end side, and inserted into the hollow rotor; a ball screw shaft fixed to the hollow rotor, including a thread groove extending in an axial direction, and inserted into a hollow section of the rod; and a nut screwed into the thread groove of the ball screw shaft, and fixed to the rod on the other end side, characterized in that a refraction stopper which abuts on an end portion of the ball screw shaft on the movable electrode side to limit the retraction of the rod is formed on the movable electrode side of the hollow section of the rod (the second aspect of the invention).

According to the second aspect of the invention, the refraction stopper which abuts on the end portion of the ball screw shaft on the movable electrode side is formed on the movable electrode side of the hollow section of the rod, and accordingly, it is not necessary to enlarged the gun main body, the hollow motor and the like. Therefore, unlike the above conventional technology, the miniaturization of the welding gun is possible.

MODE FOR CARRYING OUT THE INVENTION

A welding gun G according to an embodiment of the present invention will be described with reference to the drawings.

Figure 1:
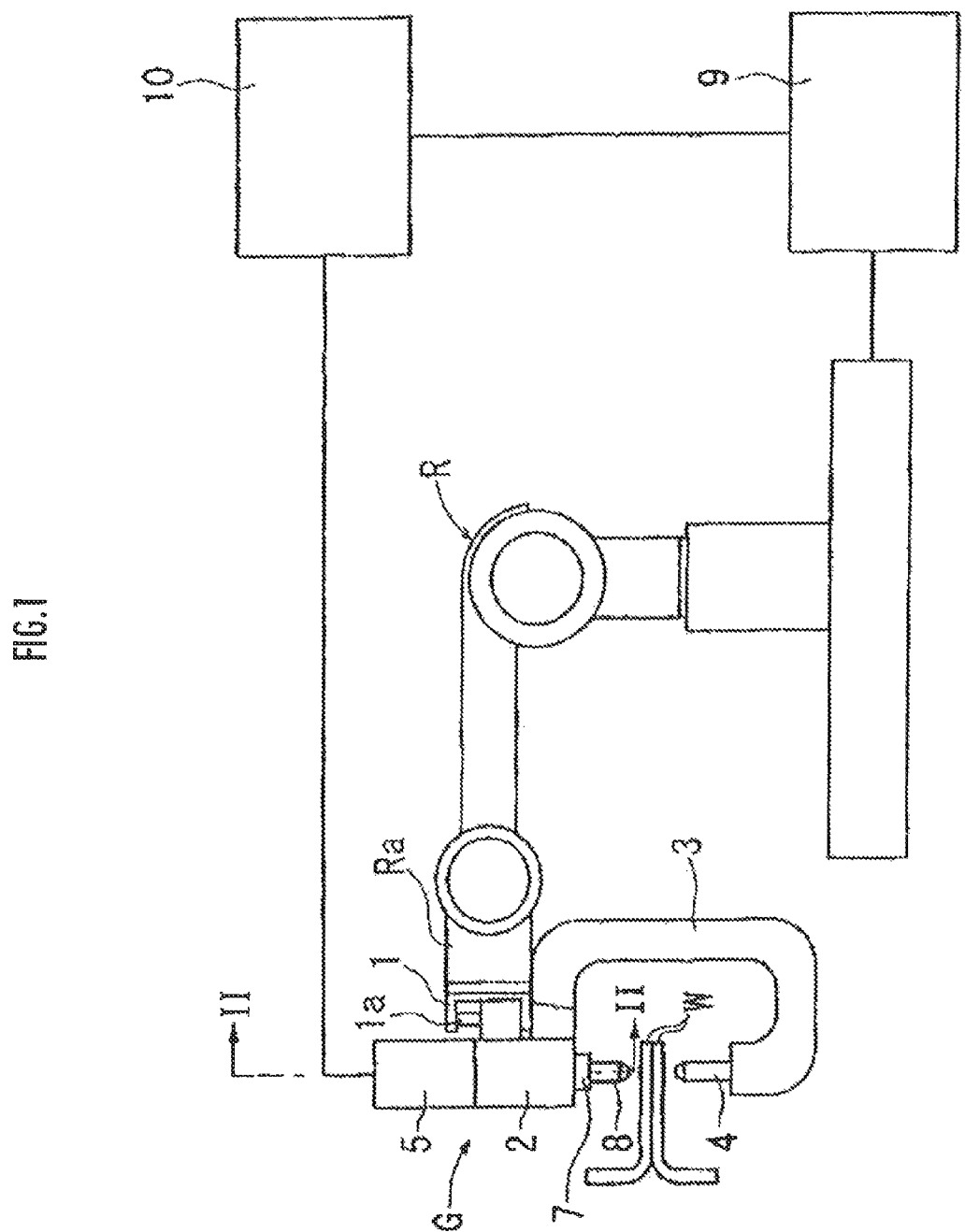
FIG. 1 is a side view of a robot on which a welding gun according to an embodiment of the present invention is mounted.

As shown in FIG. 1, the welding gun G is an electromotive spot welding gun attached to a wrist Ra as an operation end of a robot R which performs spot welding of a work W.

A gun main body 2 of the welding gun G is supported with respect to a gun support bracket 1 fixed to the wrist Ra, via a guide bar 1a so that an equalizing operation is possible in a vertical direction. A C-shaped yoke 3 extending downwardly is attached to the gun main body 2, and a lower tip 4 which is a fixed electrode tip is attached to an edge of a lower portion of the C-shaped yoke 3.

A servo type hollow motor 5 is mounted on the upper surface of the gun main body 2, and a rod 7 moved up and down by the hollow motor 5 via a feed screw mechanism 6 (see FIG. 2) described later protrudes downwardly from the gun main body 2. An upper tip 8 which is a movable electrode tip is attached to a lower end which is one end of the rod 7 so as to face the lower tip 4, and constitutes the C-shaped spot welding gun G. The welding gun G is driven and controlled by a robot controller 9 via a gun controller 10.

Figure 2:
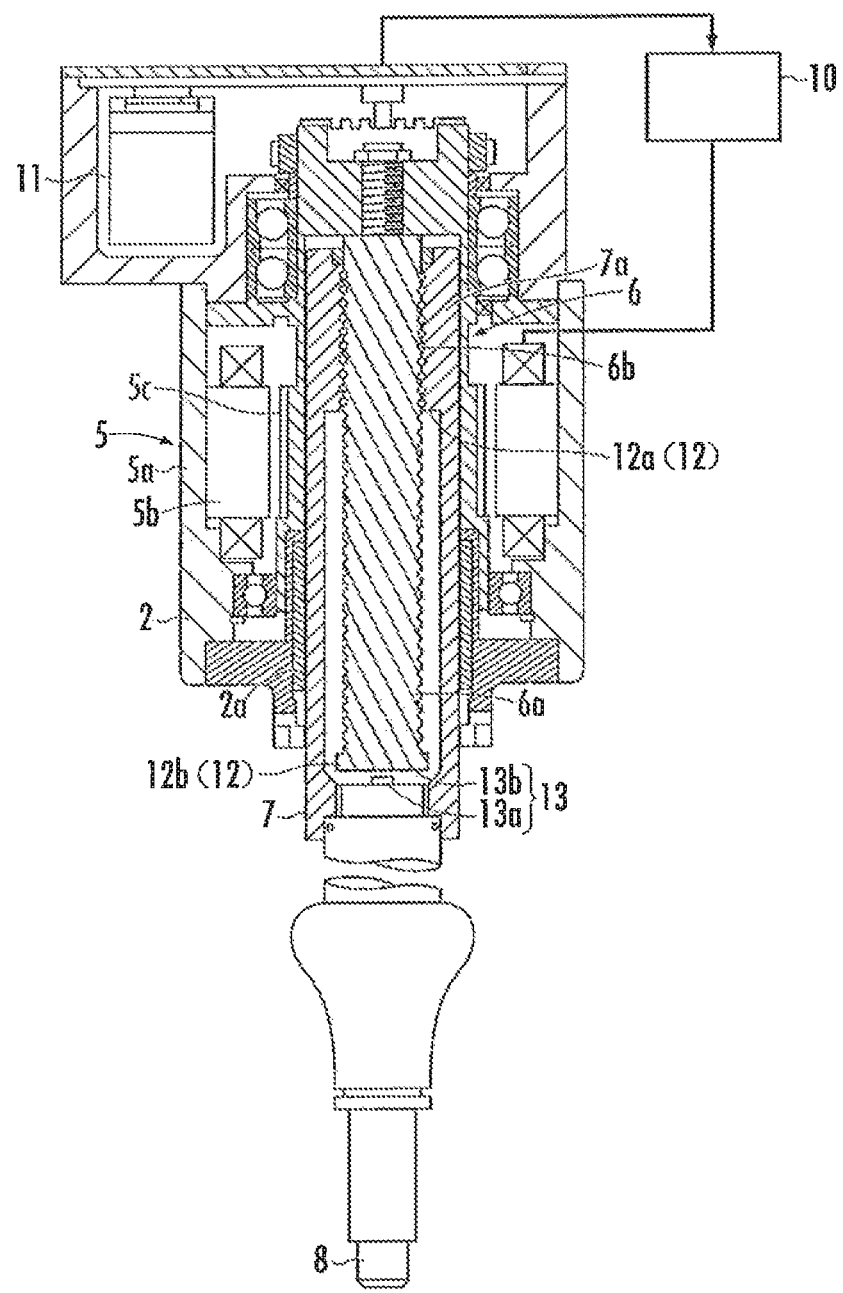
FIG. 2 is an enlarge sectional view cut along the II-II line of FIG. 1, and showing a state that a rod of the welding gun is retracted.

As shown in FIG. 2, the hollow motor 5 is composed of a housing 5a disposed to the gun main body 2, a stator 5b fixed in the housing 5a, and a hollow rotor 5c rotatably supported by the housing 5a. The rod 7 is inserted into the hollow rotor 5c through a guide sleeve 2a in the gun main body 2.

An upper portion of the rod 7 which is the other end side portion is formed to be hollow, and a ball screw shaft 6a fixed to the upper end portion of the hollow rotor 5c is inserted into a hollow section of the rod 7. A thread groove extends along an axial direction in the outer peripheral surface of the ball screw shaft 6a. Moreover, the upper end portion of the rod 7 is integrally formed with a nut section 7a having an inner peripheral surface provided with a thread groove screwed into the thread groove of the ball screw shaft 6a via a plurality of balls 6b. The ball screw shaft 6a and the nut section 7a configure the feed screw mechanism 6 which converts the rotation of the hollow rotor 5c into the vertical movement of the rod 7. By this rotating movement of the feed screw mechanism 6, the upper tip 8 is allowed to vertically advance to and retreat from the lower tip 4 (see FIG. 1). Additionally, here to suppress the total length, an encoder 11 is disposed in parallel with an axis of the ball screw shaft 6a, but the encoder 11 may be disposed on an extension of the ball screw shaft 6a.

Additionally, when the rod 7 performs an advancing/retreating movement beyond a stipulated advancing/retreating region at the failure and runaway of the gun controller 10, at the input of a wrong set value of an advancing/retreating distance or the like of the lower tip 4 into the gun controller 10 by an operator, or the like, the welding gun G fails.

For example, when the rod projects and drops down from the gun main body 2, the welding gun cannot be restored. Therefore, the welding gun G is provided with a first stopper mechanism 12 which regulates the projecting movement of the rod out of the stipulated region.

Figure 3:
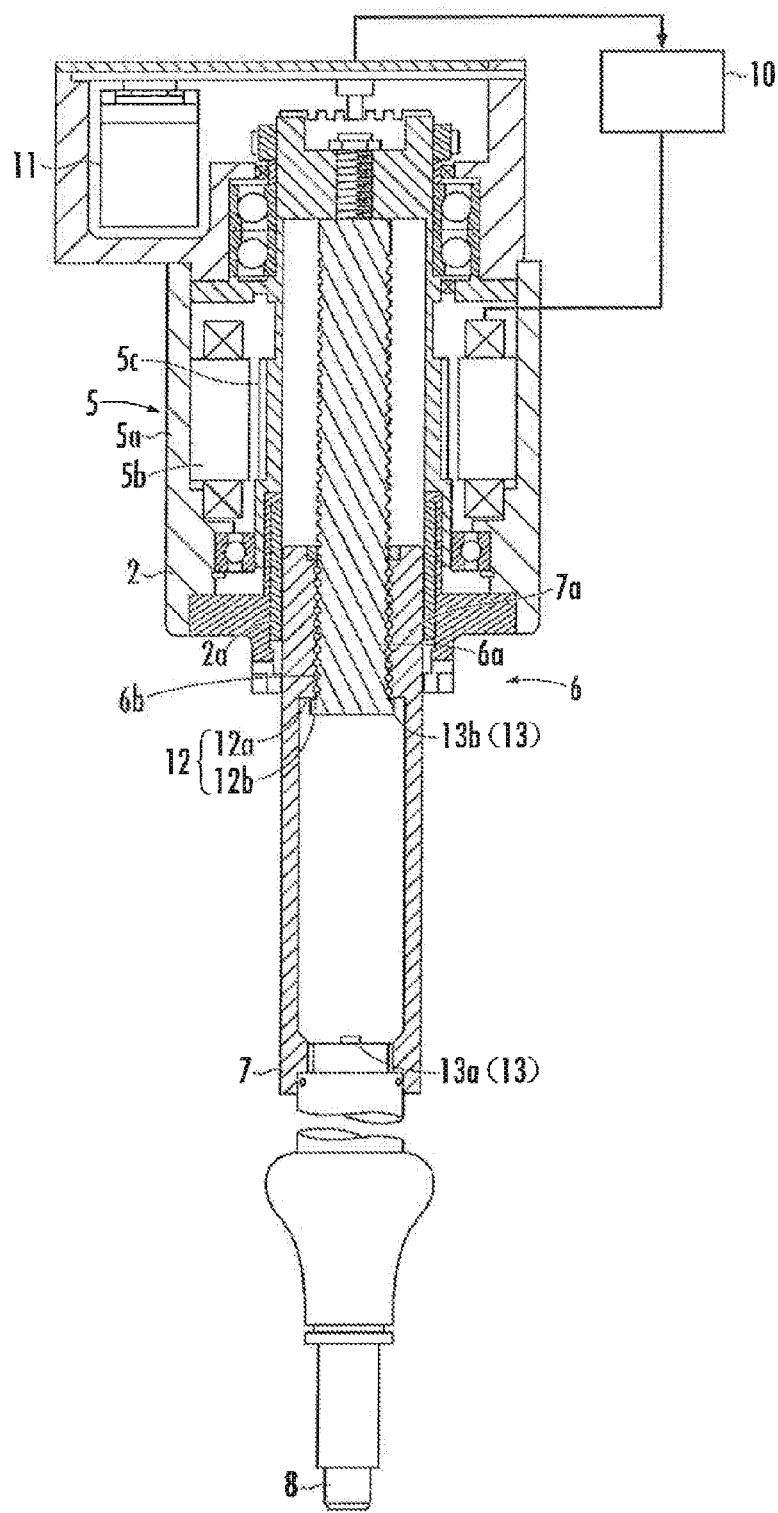
FIG. 3 is a sectional view showing a state that the rod of the welding gun of FIG. 2 is projected.

As shown in FIG. 3, the first stopper mechanism 12 is composed of a protrusion stopper 12a formed in the hollow section of the rod 7, and a flange section 12b formed at a lower end portion of the ball screw shaft 6a so as to protrude in a radial direction of the ball screw shaft 6a. Here, the protrusion stopper 12a has a constitution as a lower end surface of the nut section 7a, and at the projecting of the rod 7 out of the stipulated region, the flange section 12b abuts on the protrusion stopper 12a, whereby the ball screw shaft 6a is prevented from protruding out of the rod 7.

Moreover, the flange section 12b is formed in the lower end portion of the ball screw shaft 6a, and accordingly, it is not necessary to increase the inner diameter of the hollow rotor 5c, and the number of components does not increase. Furthermore, the protrusion stopper 12a has the constitution as the lower end surface of the nut section 7a, and accordingly, it is not necessary to increase the inner diameter of the hollow rotor 5c, and the number of the components does not increase. Therefore, unlike the above conventional technology, it is possible to miniaturize not only the hollow motor 5 but also the welding gun G, and it is possible to decrease the number of the components.

Furthermore, when the rod 7 refracts and collides with the bottom surface of the hollow rotor 5c, the feed screw mechanism 6 fails owing to the breakage of a ball circulating portion or a seal of the end surface of the nut section 7a, the biting of the ball screw shaft 6a and the nut section 7a, or the like. Therefore, the welding gun G is provided with a second stopper mechanism 13 which regulates the retraction movement of the rod out of the stipulated region.

As shown in FIG. 2, the second stopper mechanism 13 is composed of a retraction stopper 13a formed on the lower side of the hollow section of the rod 7, and a lower end portion 13b of the ball screw shaft 6a. Here, the lower end portion 13b has a constitution as a lower end surface of the flange section 12b, and at the retraction of the rod 7 out of the stipulated region, the retraction stopper 13a abuts on the lower end surface of the flange section 12b, whereby the retraction movement of the rod 7 is regulated. Additionally, a position of the retraction stopper 13a is set so that the retraction stopper 13a abuts on the lower end surface of the flange section 12b before the upper end portion of the rod 7, i.e., the upper end surface of the nut section 7a comes in contact with the bottom surface of the hollow rotor 5c.

Moreover, the refraction stopper 13a is formed on the lower side of the hollow section of the rod 7, and accordingly, it is not necessary to enlarge the gun main body 2, the hollow motor 5 or the like, and the number of the components increases only by one. Furthermore, the lower end portion 13b has the constitution as the lower end surface of the flange section 12b, and accordingly, it is not necessary to enlarge the gun main body 2, the hollow motor 5 or the like, and the number of the components does not increase. Therefore, unlike the above conventional technology, it is possible to miniaturize not only the hollow motor 5 but also the welding gun G, and it is possible to decrease the number of the components.

It is to be noted that the embodiment of the present invention has been described above with reference to the drawings, but the present invention is not limited to this embodiment. For example, in the embodiment, the case where the upper end portion of the rod 7 is integrally formed with the nut section 7a has been described, but the nut section 7a may be disposed separately from the rod 7, and the nut section 7a may be fixed to the upper end portion of the rod 7.

The invention claimed is:

1. An electromotive spot welding gun which allows a movable electrode tip to advance to and retreat from a fixed electrode tip, comprising:
   a hollow servo motor including a housing disposed to a gun main body, a stator fixed in the housing, and a hollow rotor rotatably supported by the housing;
   a rod including the movable electrode tip at one end thereof, formed to be hollow on the other end side, and inserted into the hollow rotor;

a ball screw shaft fixed to the hollow rotor, including a thread groove extending in an axial direction, and inserted into a hollow section of the rod; and a nut screwed into the thread groove of the ball screw shaft, and integrally formed with the rod on the other end side, wherein a flange section protruding in a radial direction of the ball screw shaft is formed on the movable electrode tip side of the ball screw shaft, and a protrusion stopper which abuts on the flange section to prevent the ball screw shaft from protruding out of the rod is formed in the hollow section of the rod, wherein a retraction stopper which abuts on an end portion of the ball screw shaft on the moveable electrode side to limit the retraction of the rod is formed on the movable electrode tip on the movable electrode side of the hollow section of the rod, and wherein an opening portion is defined through the one end of the rod, the opening portion communication with the hollow section of the rod.

* * * * *